(12) United States Patent
Takada et al.

(10) Patent No.: US 6,508,402 B1
(45) Date of Patent: Jan. 21, 2003

(54) IC CARD CONTACTING AND RELEASING MECHANISM

(75) Inventors: Toshifumi Takada, Tokyo (JP); Toshiyasu Ito, Chiba-ken (JP); Shigeru Sato, Chiba-ken (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/517,288

(22) Filed: Mar. 2, 2000

(30) Foreign Application Priority Data

Mar. 3, 1999 (JP) .......................................... 11-055697

(51) Int. Cl.[7] ................................................. G06K 7/08
(52) U.S. Cl. ........................ 235/451; 235/475; 235/474; 235/480; 235/483
(58) Field of Search ................................ 235/451, 480, 235/479, 475, 483

(56) References Cited

U.S. PATENT DOCUMENTS

| | | | | |
|---|---|---|---|---|
| 3,823,367 A | * | 7/1974 | Kaye et al. ................... | 320/114 |
| 4,048,476 A | * | 9/1977 | Lawter et al. ................. | 235/479 |
| 4,950,877 A | * | 8/1990 | Kurihara ...................... | 235/449 |
| 5,047,618 A | * | 9/1991 | Kobayashi .................... | 235/475 |
| 5,304,070 A | * | 4/1994 | Bertho et al. ................. | 439/157 |
| 6,042,403 A | * | 3/2000 | Nishioka ...................... | 439/159 |
| 6,059,588 A | * | 5/2000 | Tung et al. ................... | 439/159 |
| 6,293,464 B1 | * | 9/2001 | Smalley, Jr. .................. | 235/435 |

FOREIGN PATENT DOCUMENTS

| | | | | |
|---|---|---|---|---|
| JP | 401175091 | * | 7/1989 | .......... G06K/17/00 |
| JP | 9-506199 | | 6/1997 | |
| JP | 10-255910 | | 9/1998 | |
| WO | 96/02893 | | 2/1996 | |

* cited by examiner

*Primary Examiner*—Michael G. Lee
*Assistant Examiner*—Seung Ho Lee
(74) *Attorney, Agent, or Firm*—Wenderoth, Lind & Ponack, L.L.P.

(57) ABSTRACT

An IC card mechanism includes an IC card for insertion into a receiving space of an electronic device; a contact which is brought into contact with an external contact of the card when the card is inserted; a card pusher which is advanced, when the card is inserted, in an insertion direction of the card by being pushed by a front end face of the card, thereby accumulating resilient ejecting force; and a lock for locking, when the card is inserted, the card pusher in an advanced position and unlocking, when the card is pushed again in the direction of insertion of the card, the card pusher so that the card pusher is retracted by the resilient force and such that the card pusher, when retracting, pushes the front face of the card in a direction opposite to the insertion direction of the card, thereby allowing ejection of the card.

6 Claims, 6 Drawing Sheets

IC CARD CONTACTING AND RELEASING MECHANISM

BACKGROUND OF THE INVENTION

1. Field of the Invention

This invention relates to an IC card contacting and releasing mechanism used for insertion into a given electronic device.

2. Related Art

Recently, card-in operation type electronic devices have rapidly prevailed in which a user-owned IC card is inserted, when necessity arises, into a given electronic device such as a camera, a personal computer, a recording machine or the like so that information from such an electronic device is recorded in the IC card or information from the IC card is given to such an electronic device.

In the conventional art, as means for withdrawing or ejecting a memory card (releasing means) inserted in a card-in operation type electronic device, the depth dimension of insertion of the memory card is set such that a rear end of the card projects from a card inlet port when the memory is inserted, thereby allowing the user to withdraw the projected rear end using his fingers, or an eject button is disposed at an area in the vicinity of the card inlet port so that the user can push this eject button after use in order to actuate an ejecting lever for ejection of the card (releasing of the card).

However, the arrangement for withdrawing the memory card by pinching the projected end with the user's fingers requires an appropriate amount of projection of the card to allow the user to pinch the card with his fingers. This projection badly spoils an outer appearance of the device. Also, chances are increased for damaging the card by external shock or impact. In addition, if the individual user should withdraw the memory card, which is frictionally contacted with contacts, in an abnormal attitude, the card would likely be damaged or a large load would be required for the user to withdraw the memory card.

On the other hand, the arrangement for ejecting the memory card by pushing an eject button encounters such inconveniences as the eject button being difficult to form in a proper position due to limitation of space or the like. In addition, provision of the eject button not only spoils an outer appearance but also adversely affects miniaturization of the device.

SUMMARY OF THE INVENTION

It is, therefore, a first object of the present invention to provide an IC card contacting and releasing mechanism capable of solving the problems inherent in the prior art devices which employ either the method for withdrawing an IC card with the user's fingers or the method for providing an eject button for ejecting an IC card.

It is another object of the present invention to provide an IC card contacting and releasing mechanism which is simple in construction and small in size.

In order to achieve the above objects, there is essentially provided an IC card contacting and releasing mechanism including an IC card which is to be inserted into a card receiving space of an electronic device; a contact which is brought into contact with an external contact of the IC card when the IC card is inserted and brought out of contact therewith when the IC card is withdrawn; a card pusher which is advanced, when the IC card is inserted, in a direction of insertion of the IC card by being pushed by a front end face of the IC card, thereby accumulating resilient force for ejecting the IC card; and lock means for locking the card pusher in an advanced position when the IC card is inserted and unlocking the card pusher when the IC card is pushed again in the direction of insertion of the IC card, so that the card pusher is retracted by the resilient force, the card pusher, when retracting, pushing the front end face of the IC card in a direction opposite to the direction of insertion of the IC card, thereby allowing ejection of the IC card; wherein the IC card is provided on a corner portion of the front end face thereof with an inclined surface for regulating the direction of insertion of the IC card and the card pusher pushes, when retracting, against the inclined surface so that the IC card is ejected.

In another aspect of the present invention, there is also provided an IC card contacting and releasing mechanism including an IC card which is to be inserted into a card receiving space of an electronic device; a contact which is brought into contact with an external contact of the IC card when the IC card is inserted and brought out of contact therewith when the IC card is withdrawn; a card pusher which is advanced, when the IC card is inserted, in a direction of insertion of the IC card by being pushed by a front end face of the IC card, thereby accumulating resilient force for ejecting the IC card; and lock means for locking, when the IC card is inserted, the card pusher in an advanced position and unlocking, when the IC card is pushed again in the direction of insertion of the IC card, the card pusher so that the card pusher is retracted by the resilient force, the card pusher, when retracting, pushing the front end face of the IC card in a direction opposite to the direction of insertion of the IC card, thereby allowing ejection of the IC card; wherein the card pusher is arranged in such a manner as to be able to advance and retract in the direction of insertion and withdrawal of the IC card and allowed to extend along one side surface of the IC card so that the card pusher forms a side ruler for guiding insertion and withdrawal of the IC card.

In one preferred embodiment, the card pusher includes an inclined pressure surface which is complementary with an inclined pressure receiving surface formed on a corner portion of the front end face of the IC card and which is adapted to push the pressure receiving inclination surface.

A turnable arm may be turnably supported on an end portion of the card pusher and a free end of the turnable arm may be turned between a locked and an unlocked position by a cam element.

Other objects and advantages of the invention will become more apparent during the course of the following description when taken in connection with the accompanying drawings.

BRIEF DESCRIPTION OF THE DRAWINGS

FIG. 7 is a sectional view showing a state in which the IC card has been inserted so deeply that the IC card can be locked;

FIG. 8 is likewise a sectional view showing a state in which the IC card has been inserted so deeply that the IC card is in a locked position;

FIG. 9 is likewise a sectional view showing a state in which the IC card has been inserted again so deeply that the IC card can be unlocked;

FIG. 10 is likewise a sectional view showing a state in which the IC card is in an ejected position;

FIGS. 11 and 12 show sectional views showing one example in which a pair of push levers and lock mechanisms are provided on opposite side portions of an IC card while FIGS. 1 through 10 show an example in which a push lever and a lock mechanism are provided on one side portion of the IC card, with FIG. 11 showing a locked state; and FIG. 12 is a sectional view of a card connector showing an unlocked state, i.e., the IC card being in an ejected position.

DETAILED DESCRIPTION OF THE EMBODIMENTS

Figure 1:
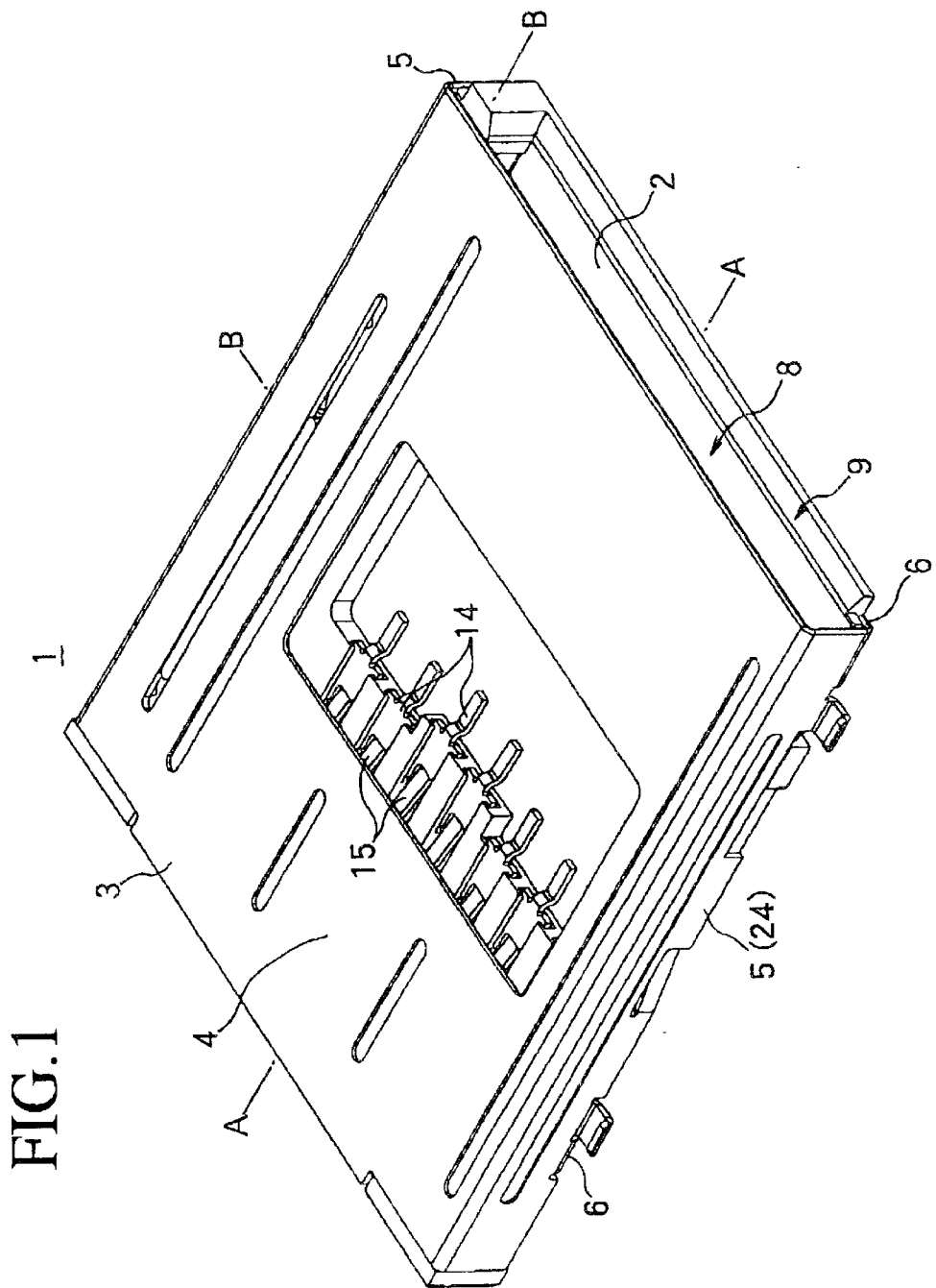
FIG. 1 is a perspective view of a connector which forms an IC card contacting and releasing mechanism.
Figure 2:
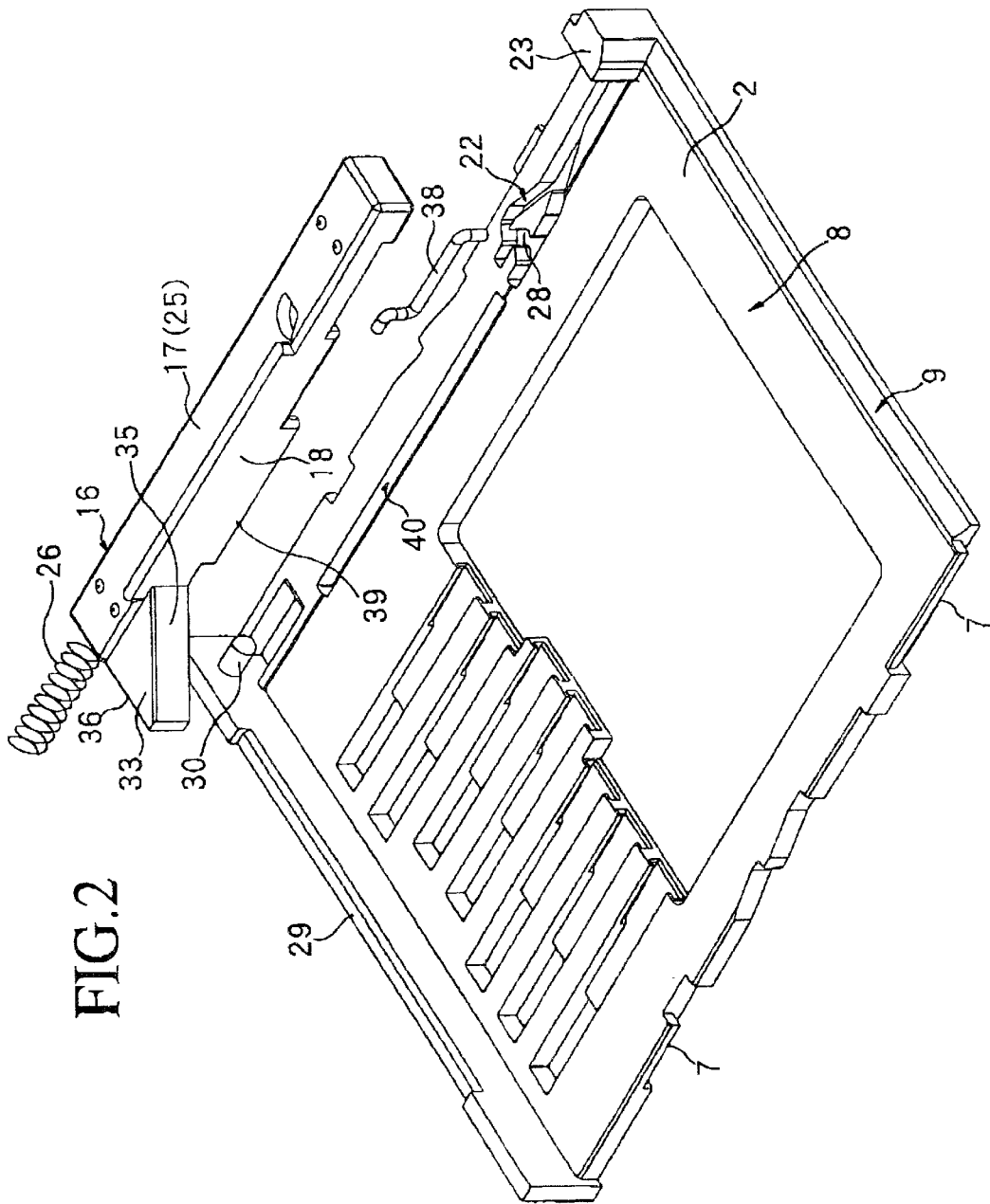
FIG. 2 is a perspective view of the connector of FIG. 1 but showing a state in which a cover is removed from the connector, and a base and a card pusher of the connector are shown in an exploded fashion.
Figure 3:
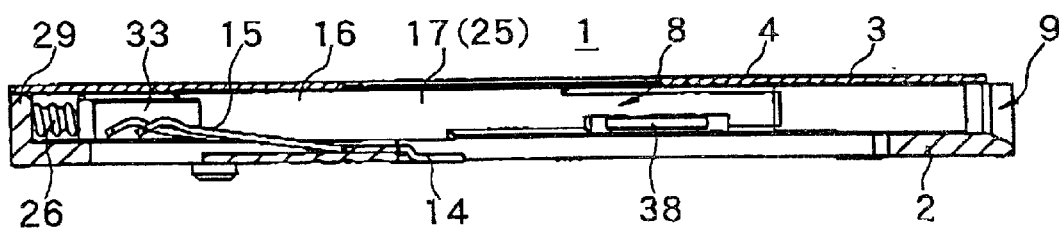
FIG. 3 is a sectional view taken on line A—A of FIG. 1, showing a state before insertion of an IC card.
Figure 4:
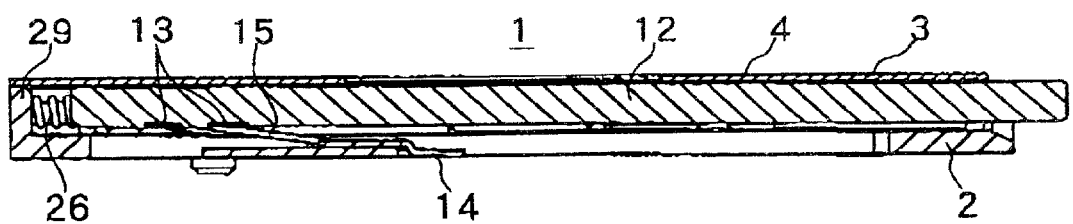
FIG. 4 is likewise a sectional view taken on line A—A of FIG. 1, showing a state after insertion of an IC card.
Figure 5:
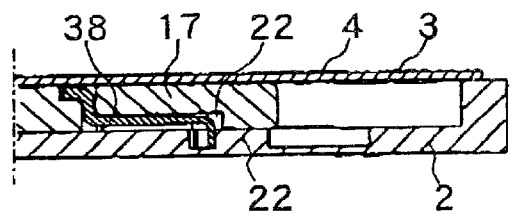
FIG. 5 is a sectional view taken on line B—B of FIG. 1.

Embodiments of the present invention will now be described with reference to FIGS. 1 through 12 inclusive.

A connector housing generally denoted by reference numeral 1 comprises a base 2 and a cover 3. The base 2 and the cover 3 are integrally molded from insulative material such as synthetic resin. In the alternative, the base 2 may be integrally molded from insulative material and the cover 3 may be formed by blanking and bending a plate metal.

The cover 3 includes a top plate portion 4 and left and right side plates 5 extending in a direction of insertion of an IC card 12 along left and right sides of the top plate portion 4. The cover 3 is closed in such a manner as to embrace the base 2 with engagement claws 6, which are formed on the left and right side plates 5 of the cover 3, bend-engaged with recesses 7 formed in left and right side edges of the base 2. By doing so, the connector housing 1 is assembled. A card receiving space 8 is formed between the base 2 and the cover 3. The card receiving space 8 is open at a rear side surface of the connector housing 1 so as to serve as a card inlet port 9. This card inlet port 9 is in agreement with a card inlet port which is formed in an external wall of a given electronic device.

A plurality of electrode pads 13 are implanted in an outer surface of the IC card 12. Contacts 14 are adapted to pressure contact the electrode pads 13. Each contact 14 has a resilient contact piece 15 extending in a direction of insertion/withdrawal of the IC card 12. Thus, the contacts 14 can be resiliently displaced upward and downward.

The IC card 12 inserted through the card inlet port 9 pushes the resilient contact piece 15 downward at its outer surface so as to be pressure contacted at the electrode pad 13 by reaction thereof.

The card receiving space 8 is provided at one side thereof with a card pusher 16. This card pusher 16 is caused to advance in a direction of insertion of the IC card 12 by being pushed by a front end face of the IC card 12 at the time of insertion thereof so that resilient force for ejecting the IC card 12 is accumulated.

The card pusher 16 is reciprocally movably disposed in a direction of insertion of the IC card 12. The card pusher 16 is comprised of a push lever 17 extending along one side of the IC card 12. The push lever 17 forms a side ruler which guides the insertion/withdrawal of the IC card 12.

That is to say, one side surface 21 (i.e., that side surface 21 parallel to the direction of insertion/withdrawal of the IC card 12) of the IC card 12 is regulated by an inner side surface 18 of the push lever 17. That is to say, the push lever 17 functions as a second side ruler 25.

At the same time, the other side surface 20 of the IC card 12 is regulated by the other side wall of the connector housing 1 which extends in opposing parallel relation to the push lever 17. That is to say, the other side wall functions as a first side ruler 24. This first side ruler 24 is formed by one side plate 5 of the cover 3. Thus, the insertion/withdrawal of the IC card 12 is guided by the first and second side rulers 24, 25.

The push lever 17 has a slide guide 39 integrally formed on a lower surface thereof and projecting downward therefrom. On the other hand, the card receiving space 8 has a guide slot 40 formed in an expanded portion of the base 2 which expands from one side edge of the card receiving space 8. The guide slot 40 extends in a direction of insertion and withdrawal of the IC card 12. The slide guide 39 is slidingly fitted into the guide slot 40 so that the push guide 17 can properly be moved linearly reciprocally in a direction of insertion and withdrawal of the IC card 12.

The push lever 17 is biased in a direction of ejection of the IC card 12 by a coiled spring 26 that constitutes a biasing means. The coiled spring 26 is inserted into a groove or slot 27 extending in a direction of insertion and withdrawal of the IC card 12 which groove or slot 27 is disposed longitudinally of the push lever 17, with one end of the coiled spring 26 supportingly resiliently contacted with a bottom surface of the groove or slot 27 and with the other end of the coiled spring 26 projecting from the groove or slot 27 and fitted onto a spring retaining projection 30 projecting from a front wall 29 of the base so that the coiled spring 26 is correctly positioned.

The coiled spring 26 is compressed between the front wall 29 and a bottom wall of the groove or slot 27 and normally biases the push lever 17 in a direction of ejection of the IC card 12 by the biasing force.

A card engagement portion 33 is disposed on a front end of the push lever 17. The IC card 12 has an inclined surface 34 formed on one corner portion of the front end face and adapted to instruct (regulate) an insertion attitude of the IC card 12. The card engagement portion 33 acts on the inclined surface 34.

Preferably, the card engagement portion 33 is provided with an inclined pressure surface 35 which is complementary with the pressure receiving surface 34, such that the inclined surfaces 34, 35 can opposingly contact each other in parallel relation.

A front end face 36 of the card engagement portion 33 can be generally at a same level as a front end face 37 of the IC card 12. That is to say, the front end face 36 of the card engagement portion 33 can be set to such a level that when the front end face 37 of the IC card 12 comes into abutment with the front wall of the connector housing 1 (i.e., the inner surface of the front wall 29 of the base 2), the front end face 36 of the card engagement portion 33 almost contacts the front wall 29 of the connector housing 1.

The IC card contacting and releasing mechanism is constructed in the manner as described above, in which the IC card 12 is inserted into the card receiving space of a given electronic device so as to be brought into contact with the contacts 14 which are disposed within the space and, when the IC card 12 is ejected, the electrical contact between the IC card 12 and the contacts 14 is released. The card receiving portion 33 is received in a delta space which is formed at an external region of the inclined surface 34.

The above mechanism includes the push lever 17 (i.e., pusher 16) which accumulates resilient force for ejecting the IC card 12 by being pushed by the IC card 12 at the time of insertion thereof. The push lever 17 is arranged in such a manner as to be able to advance and retract in the direction of insertion and withdrawal of the IC card 12. The IC card contacting and releasing mechanism further includes a lock mechanism for locking the card pusher 16 in an advanced position when the IC card 12 is inserted and unlocking the card pusher 16 when the IC card 16 is pushed again in the direction of insertion of the IC card 16, so that the card pusher 16 is retracted by the resilient force of the card pusher 16 and ejection of the IC card 12 is allowed.

A turnable arm 38 is turnably supported at a basal end thereof by the push lever 17 and a free end of the turnable arm 38 is turned between a locked position and an unlocked position by a cam element which is integral with the base 2.

The push lever 17 forming the card pusher 16 extends along an inner surface of a side wall 19 which is disposed opposite the side plate 5 forming the first side ruler 24 which extends along a direction of insertion of the IC card 12 of the connector housing 1. The push lever 17 is interposed between the inner surface of the side wall 19 of the push lever 17 and one side surface 21 of the IC card 12 and reciprocally movably supported in a direction of insertion/withdrawal of the IC card 12.

In other words, the push lever 17 extends along the one side surface 21 of the IC card 12 to be inserted. This push lever 17 is interposed between the one side surface 21 of the IC card 12 and the side wall 19 and reciprocally movably supported in a direction of insertion/withdrawal of the IC card 12.

The lock mechanism is comprised of a known heart cam 22 and the above turnable arm 38. The heart cam 22 is disposed at one side portion of the base 2 (i.e., one side portion of the card receiving space 8) and the turnable arm 38 is slidingly fitted to the heart cam 22.

A construction and operation of the lock mechanism will now be described with reference to FIGS. 6 through 10.

Figure 6:
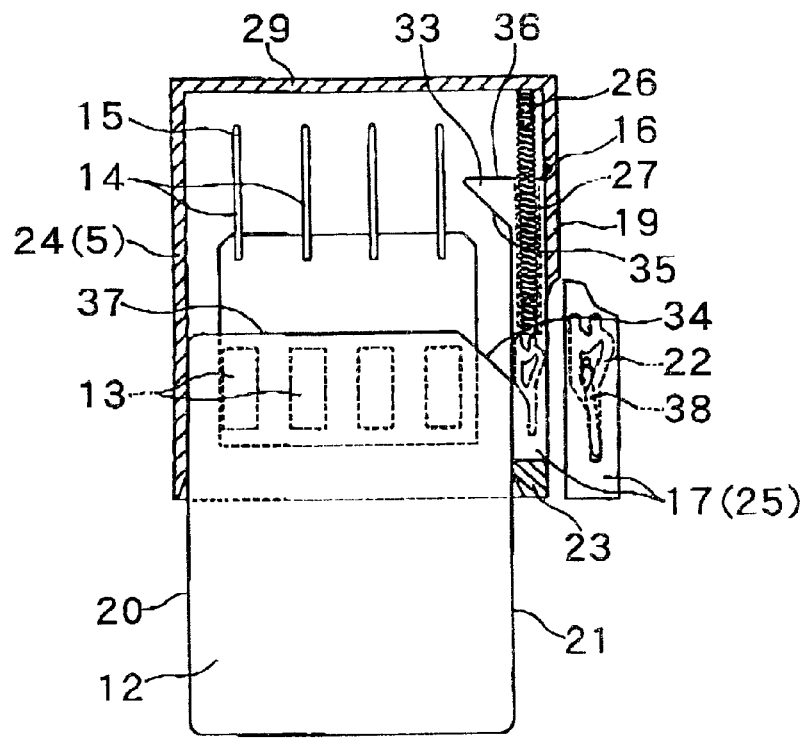
FIGS. 6 through 10 are sectional views of a card connector for explaining the insertion and ejection operation of an IC card in a sequential manner with FIG. 6 showing a state immediately after insertion of the IC card.

As shown in FIG. 6, when the IC card 12 is not received in the card receiving space 8, the card pusher 16 is retracted by resilient force of the coiled spring 26 and abutted with a stopper 23 integral with the base 2 at one end of the card inlet port 9 for standby.

Figure 7:
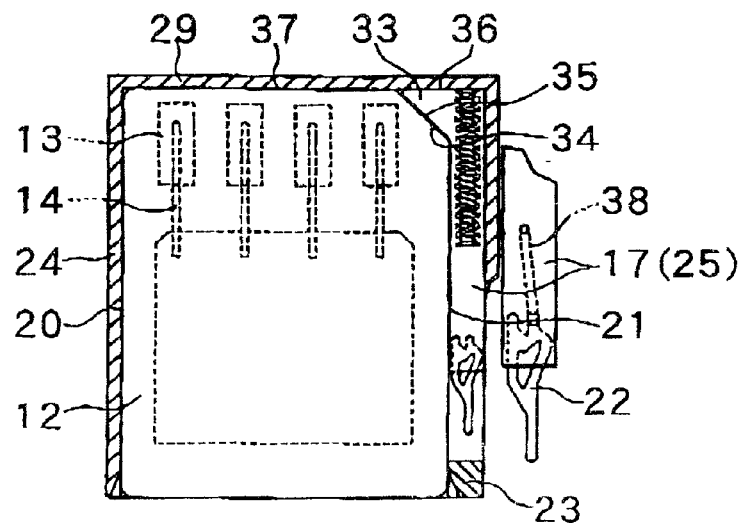

As shown in FIGS. 6 and 7, when the IC card 12 is inserted until the front end face 37 of the IC card 12 comes into abutment with the front wall 29 of the connector housing 1, the inclined pressure receiving surface 34 pushes the pressure inclination surface 35 of the push lever 17 to cause the push lever 17 to advance while compressing the coiled spring 26.

At that time, as shown in FIG. 7, the turnable arm 38 advances together with the push lever 17 and guides the free end of the push lever 17 to a lockable position along a cam orbit of the heart cam 22.

Figure 8:
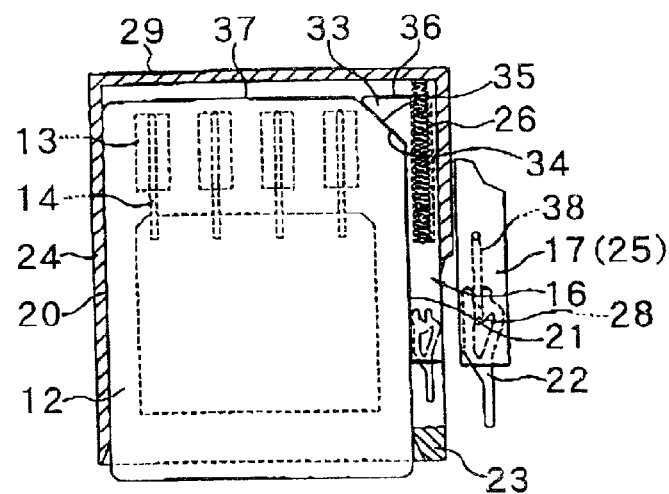

As shown in FIG. 8, when the insertion force to the IC card 12 is canceled (or released), both the push lever 17 and turnable arm 38 are slightly retracted by resilient force of the coiled spring 26 and engaged in an engagement recess 28 of the heart cam 22 so that further retraction is stopped.

As a consequence, the IC card 12 is stopped at a predetermined insertion position and the electrode pad 13 is kept pressure contacted with the contacts 14.

Figure 9:
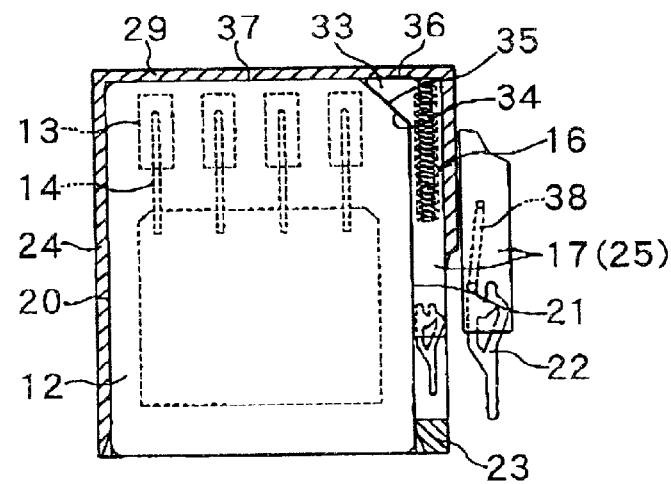

As shown in FIG. 9, the IC card 12 is pushed again in a direction of insertion thereof so that the inclined pressure surface 35 is pushed by the inclined pressure receiving surface 34. This pushing causes the push lever 17 to advance slightly until it comes into abutment with the front wall 29 while compressing the coiled spring 26. At that time, the turnable arm 38 advances together with the push lever 17 and escapes from the recess 28 thereby realizing an unlocked (releasable) state.

Figure 10:
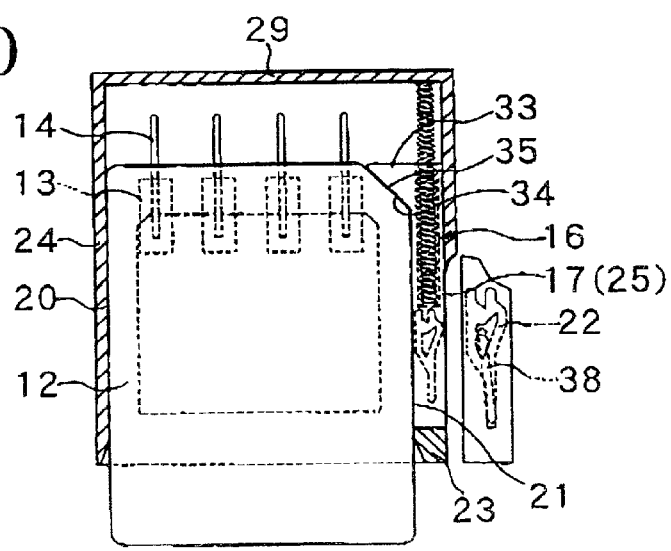

As shown in FIG. 10, when the pushing force in a direction of insertion of the IC card 12 is canceled (or released), the push lever 17 is retracted by the resilient force of the coiled spring 26 and the inclined pressure receiving surface 35 is pushed by the pressure surface 34 so that the IC card 12 is projected a predetermined amount from the card inlet port 9. That is to say, the IC card 12 is ejected. At that time, the turnable arm 38 is retracted together with the push lever 17 while being guided by the orbit of the cam heart 22.

The IC card 12 is guided rearwardly (direction opposite to the direction of insertion of the IC card 12) when the push lever 17 is retracted, while being guided by the first and second side rulers 24, 25 and allowed to project from the card inlet port 9.

Figure 11:
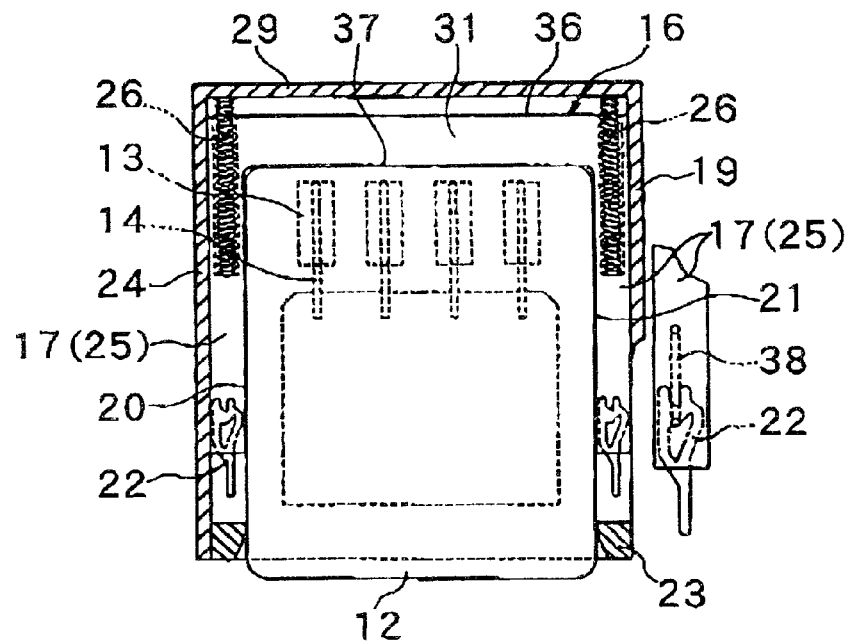
Figure 12:
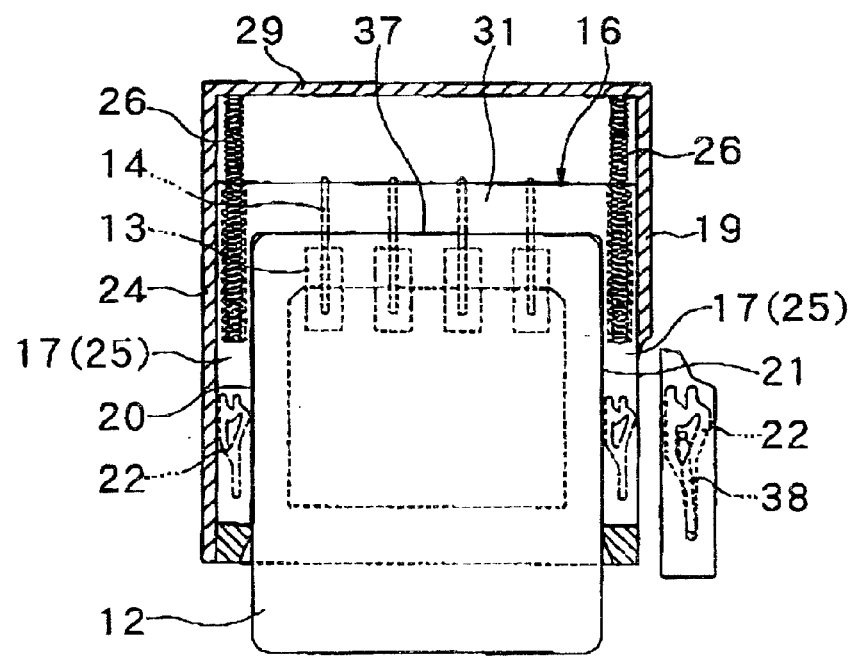

FIGS. 11 and 12 show an example in which the push levers 17 forming the card pushers 16 extend along left and right side portions of the card receiving space 8, thereby forming a pair of lock mechanisms. That is to say, a pair of push levers 17 extending in the direction of insertion of the IC card 12 are reciprocally movably disposed along opposite sides of the base 2. The turnable arm 38 is turnably supported on each push lever 17. A pair of heart cams 22 are disposed at opposite sides of the base 2 and free ends of the turnable arms 38 are slidingly fitted to the heart cams 22.

The push levers 17 form the first and second side rulers 24, 25 for regulating the left and right side surfaces 20, 21 of the IC card 12.

The IC card 12 is inserted into the card receiving space 8 which is formed between the left push lever 17 and the right push lever 17. The IC card 12 is inserted and ejected while being guided by the left and right push levers 17.

A construction of the left and right push levers 17 and a resiliently retaining construction formed by the coiled spring 26 are the same as above. The left and right push levers 17 are connected together at front ends thereof through the connection bar 31.

As shown in FIG. 11, this connection bar 31 extends in such a manner as to oppose the front end face of the IC card 12 in parallel relation. At the time of insertion, the front end face of the IC card 12 pushes the connection bar 31 to cause the pair of left and right push levers 17 to advance while compressing the coiled springs 26, thereby realizing a locked state by the lock mechanism.

As shown in FIG. 12, the locked state by means of the lock mechanism is released by pushing the IC card 12 again, and the front end face of the IC card 12 is pushed by the connection bar 31 in the direction opposite to the direction of insertion to eject the IC card 12.

The pair of left and right push levers 17 are connected together at front ends thereof by the connection bar 31. The push levers 17 are resiliently retained by a pair of coiled springs 26 in accordance with the construction mentioned above. At that time, operation of the heart cam 22 and the turnable arm 38 for controlling the locking position and unlocking position of each push lever 17 is the same as described above.

By having the inclined surface formed on the end face corner portion of the IC card function not only as means for instructing (regulating) a direction of insertion of the IC card but also as a pressure receiving surface for the card pusher, the card pusher can be disposed within a delta space formed at the inclined surface without allowing any amount of projection, or only a limited amount of projection of the pushing portion of the card pusher from the front end face. Owing to this feature, the mechanism as a whole can be made small in size. This effect can effectively be achieved by defining the pushing portion of the card pusher as an inclined pressure inclination surface which is in synchronism with the pressure receiving surface. Also, the inclined pressure surface can serve as means for alerting of an incorrect direction of insertion of the IC card.

In the case where the IC card is ejected by pushing the pressure receiving surface of the IC card, there is produced a component force for pushing the opposite side surface of the IC card to the card pusher against a side ruler opposed thereto. Guided by this side ruler, the IC card can be ejected smoothly without being inclined.

By having the card pusher serve also as a side ruler for guiding insertion/withdrawal of the IC card, there is no need of provision of another side ruler corresponding to the card pusher. This can contribute to reduction of space and miniaturization of the size. The IC card is guided by the card pusher while being inserted or ejected.

While the invention has been illustrated and described as embodied in an IC card contacting and releasing mechanism, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the present invention as set forth in the appended claims.

What is claimed is:

1. An IC card contacting and releasing mechanism including:

an IC card which is to be inserted into a card receiving space of an electronic device;

a contact which is brought into contact with an external contact of said IC card when said IC card is inserted and brought out of contact therewith when said IC card is withdrawn;

a card pusher which is advanced, when said IC card is inserted, in a direction of insertion of said IC card by being pushed by a front end face of said IC card, thereby accumulating resilient force for ejecting said IC card; and lock means for locking said card pusher in an advanced position when said IC card is inserted and unlocking said card pusher when said IC card is pushed again in the direction of insertion of said IC card, so that said card pusher is retracted by the resilient force, said card pusher, when retracting, pushing the front end face of said IC card in a direction opposite to the direction of insertion of said IC card, thereby allowing ejection of said IC card;

wherein said IC card is provided on a corner portion of the front end face thereof with an inclined surface for regulating the direction of insertion of said IC card and said card pusher pushes, when retracting, against said inclined surface so that said IC card is ejected.

2. An IC card contacting and releasing mechanism according to claim 1, wherein said card pusher includes an inclined pressure surface which is complementary with an inclined pressure receiving surface formed on a corner portion of the front end face of said IC card and which is adapted to push said inclined pressure receiving surface.

3. An IC card contacting and releasing mechanism according to claim 1, wherein a turnable arm is turnably supported on an end portion of said card pusher and a free end of said turnable arm is turned between a locked and an unlocked position by a cam element.

4. An IC card contacting and releasing mechanism including:

an IC card which is to be inserted into a card receiving space of an electronic device;

a contact which is brought into contact with an external contact of said IC card when said IC card is inserted and brought out of contact therewith when said IC card is withdrawn;

a card pusher which is advanced, when said IC card is inserted, in a direction of insertion of said IC card by being pushed by a front end face of said IC card, thereby accumulating resilient force for ejecting said IC card; and lock means for locking, when said IC card is inserted, said card pusher in an advanced position and unlocking, when said IC card is pushed again in the direction of insertion of said IC card, said card pusher so that said card pusher is retracted by the resilient force, said card pusher, when retracting, pushing the front end face of said IC card in a direction opposite to the direction of insertion of said IC card, thereby allowing ejection of said IC card;

wherein said card pusher is arranged in such a manner as to be able to advance and retract in the direction of insertion and withdrawal of said IC card and allowed to extend along one side surface of said IC card so that said card pusher forms a side ruler for guiding insertion and withdrawal of said IC card.

5. An IC card contacting and releasing mechanism according to claim 2, wherein said card pusher includes a pressure inclination surface which is in synchronism with a pressure receiving inclination surface formed on a corner portion of the front end face of said IC card and which is adapted to push said pressure receiving inclination surface.

6. An IC card containing and releasing mechanism according to claim 2, wherein a turnable arm is turnably supported on an end portion of said card pusher and a free end of said turnable arm is turned between a locked and an unlocked position by a cam element.

* * * * *